UNITED STATES PATENT OFFICE.

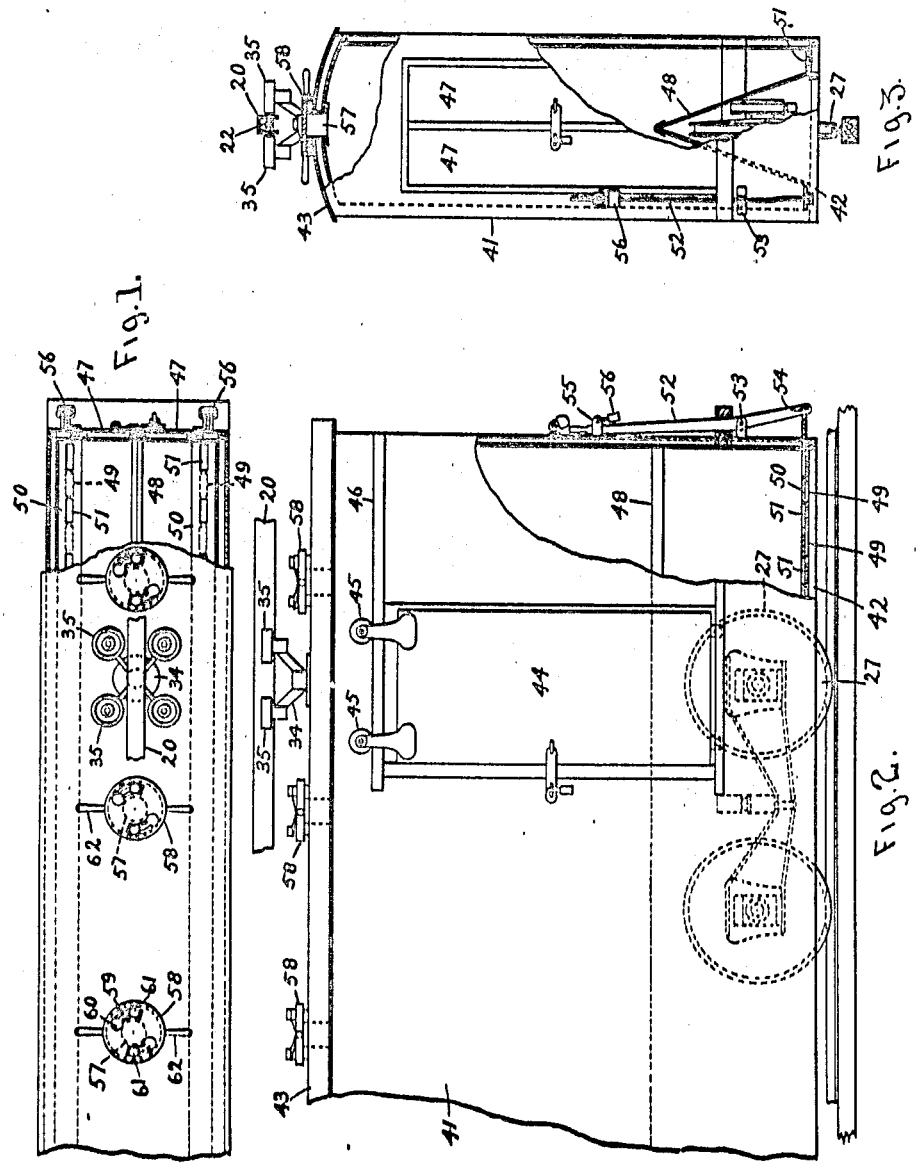

EBEN MOODY BOYNTON, OF WEST NEWBURY, MASSACHUSETTS.

RAILWAY FREIGHT-CAR.

1,042,527. Specification of Letters Patent. Patented Oct. 29, 1912.

Application filed April 8, 1909, Serial No. 468,630. Renewed March 22, 1912. Serial No. 685,415.

*To all whom it may concern:*

Be it known that I, EBEN MOODY BOYNTON, of West Newbury, in the county of Essex and State of Massachusetts, have invented certain new and useful Improvements in Railway Freight-Cars, of which the following is a specification.

This invention relates to railway freight cars adapted for transporting coal, grain, gravel, or other homogeneous masses.

The invention relates more particularly to cars of the monorail type than to the present type of car adapted for transportation on a pair of rails.

The chief object of the invention is to facilitate loading and unloading of freight of the character above specified, and for this reason the car embodying the present invention is provided with one or more openings in the roof through which the articles of freight may be introduced, and with discharge openings in the floor, and with covers controlling the discharge openings by which the discharge of the freight may be controlled.

The loading openings in the roof of the car are provided with separate covers which are adapted to seal the openings tightly and render them water tight. The floor or bottom wall of the car consists of horizontal portions and transversely inclined portions which divide the lower space of the compartment into longitudinal troughs, each trough having a horizontal bottom wall. The discharge openings are preferably provided in the horizontal portions of the wall, said openings being arranged in longitudinal series so that they may be covered or uncovered simultaneously by a slide or slides movable longitudinally, and provided with openings adapted to register with the openings in the floor of the car. Transversely inclined portions of the floor are inclined in opposite directions and extend upwardly toward each other from the horizontal floor portions. The inclined portions may meet or may be connected by an intermediate portion. In either event they are adapted when so inclined to guide the pieces or particles of freight to the discharge openings and to form and constitute a housing for the traction wheels. The traction wheels may therefore extend well above the horizontal planes of the discharge openings, and the floor of the car may therefore extend relatively close to the track upon which the wheels roll.

Of the accompanying drawings which illustrate one form in which the invention may be embodied, Figure 1 represents a top plan view, partly in section, of a freight car adapted to roll upon a single rail. Fig. 2 represents a side elevation thereof, partly in section. Fig. 3 represents an end elevation, partly in section.

The same reference characters indicate the same parts wherever they occur.

The body of the car illustrated comprises side walls 41, a roof or top wall 43 and a floor comprising horizontal portions 42, and transversely inclined portions 48. The horizontal portions 42 constitute marginal portions of the floor and the inclined portions 48 extend upwardly toward each other at opposite inclinations from the marginal portions. The meeting edges of the portions 48 may be joined in any suitable way.

The floor of the car comprising the aforesaid angular portions divides the lower space of the compartment into longitudinal troughs, and provides a housing for the traction wheels 27. The horizontal marginal portions 42 are provided with discharge openings 49, said openings being arranged in longitudinal series as shown by Figs. 1 and 2.

Sliding covers 50 are arranged in the longitudinal troughs, said covers being formed with openings 51 which are adapted to register with the discharge openings 49, or to be moved out of register with the discharge openings. As shown by the drawings the discharge openings 49 are covered by solid portions of the slides. The slides 50 project through the openings in the end walls of the car and are connected to operating levers 52. The levers are pivoted at 53 and are arranged to move between lugs 55 affixed to the end of the car. When the slides are in closed position the levers extend between said lugs 55 and are adapted to be locked by padlocks 56, said padlocks extending through said lugs.

The side walls of the car may be provided with doors such as that indicated at 44 and the end walls may be provided with doors such as those indicated at 47. The doors 44 are suspended by wheels 45 rolling upon a guide or track 46.

The roof 43 of the car is provided with annular members forming openings 57, said openings being provided for receiving articles of freight.

58 indicates covers for the openings 57, said covers having the form of circular caps. They are provided with segmental keyhole slots 59 of which the enlarged end openings 60 are adapted to receive flanged studs 61 projecting upwardly from the annular members in which the openings 57 are formed. The caps or covers 58 are provided with spokes or handles 62 whereby they may be turned relatively to the locking studs 61.

An advantage of constructing a car for handling merchandise of the character named is evident when it is observed that the merchandise may be conducted to the openings 57 by chutes or other means, and that the discharge from the car is effected simply by moving the slides 50 so as to uncover the openings 49 in the bottom of the car. The loading and unloading of the car is therefore effected without requiring handling of the merchandise for transporting it in small quantities to and from the car.

The car is provided with means for engaging a guide rail for maintaining the car in an upright position. The guide rail is indicated at 20 and is arranged above the car. The roof 43 of the car supports a plurality of fixtures or brackets such as that indicated at 34, said brackets being provided with wheels or rolls 35 arranged to embrace the rail 20. It is proposed to utilize electricity as the motive force for propelling the car, or a train of such cars, and for this reason the guide rail 20 is formed as shown by Fig. 3. The rail as shown is of U-shaped cross section, and is inverted so that it is open at the bottom. The rail thus constitutes a housing for an electric conductor such as that indicated at 22, the conductor being supported within the rail 20 by any suitable insulating means. The rail 20 being open at the bottom is adapted to admit a trolley (not shown) which may be mounted upon the roof of the car to engage the under surface of the conductor 22.

Having thus explained the nature of my said invention and described a way of constructing and using the same, although without attempting to set forth all of the forms in which it may be made or all of the modes of its use, which I claim is:—

1. A car for transporting merchandise such as a mass of loose particles, comprising a closed compartment having openings in the top and bottom walls, rotatable caps for the top openings, interlocking means on the top wall and on said caps for seaming the caps in closing position, sliding strips each having a series of openings adapted to cover and uncover the openings in said bottom wall, and means for moving said slides.

2. A railway freight car comprising wheels, and a body having a floor consisting of horizontal and transversely inclined portions dividing the lower space into longitudinal troughs, said bottom wall having discharge openings, and sliding covers for said openings.

3. A monorail freight car comprising wheels, and a body having a floor consisting of horizontal marginal portions and transversely inclined portions extending upwardly toward each other between said marginal portions, said wheels being arranged in the space between said inclined portions, and sliding strips extending longitudinally in engagement with said marginal portions, said strips and horizontal portions having openings arranged to be covered and uncovered by longitudinal movement of the strips.

In testimony whereof I have affixed my signature, in presence of two witnesses.

EBEN MOODY BOYNTON.

Witnesses:
I. V. MARTIN,
JAS. A. ROONEY.

---

Copies of this patent may be obtained for five cents each, by addressing the "Commissioner of Patents, Washington, D. C."